US012358394B2

(12) United States Patent
Ozawa et al.

(10) Patent No.: US 12,358,394 B2
(45) Date of Patent: Jul. 15, 2025

(54) POWER MANAGEMENT SYSTEM, SERVER, AND METHOD OF ADJUSTING POWER DEMAND AND SUPPLY

(71) Applicant: TOYOTA JIDOSHA KABUSHIKI KAISHA, Toyota (JP)

(72) Inventors: Tamaki Ozawa, Toyota (JP); Tohru Nakamura, Toyota (JP); Akinori Morishima, Naka-gun (JP); Yusuke Horii, Nagoya (JP); Wataru Matsumura, Ichihara (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 694 days.

(21) Appl. No.: 17/728,106

(22) Filed: Apr. 25, 2022

(65) Prior Publication Data

US 2022/0396170 A1 Dec. 15, 2022

(30) Foreign Application Priority Data

Jun. 9, 2021 (JP) .................................. 2021-096392

(51) Int. Cl.
*B60L 53/66* (2019.01)
*B60L 53/63* (2019.01)
(Continued)

(52) U.S. Cl.
CPC .............. *B60L 53/665* (2019.02); *B60L 53/63* (2019.02); *H02J 3/322* (2020.01); *B60L 55/00* (2019.02);
(Continued)

(58) Field of Classification Search
CPC ........ B60L 53/665; B60L 53/63; B60L 55/00; H02J 3/322; H02J 2310/48; H02J 2310/64;
(Continued)

(56) References Cited

U.S. PATENT DOCUMENTS

2012/0326505 A1 12/2012 Otsuki et al.
2013/0166080 A1* 6/2013 Furuta .................... G05B 13/02
700/286
(Continued)

FOREIGN PATENT DOCUMENTS

JP 2013-009565 A 1/2013
WO WO 2013/115318 A1 8/2013
WO WO 2019/130930 A1 7/2019

OTHER PUBLICATIONS

Tao Chen et al., "Optimal Demand Response Strategy of Commercial Building-Based Virtual Power Plant Using Reinforcement Learning", IET Generation, Transmission & Distribution, IET, UK, vol. 15, No. 16, Apr. 1, 2021, pp. 2309-2318.

*Primary Examiner* — Paul Dinh
(74) *Attorney, Agent, or Firm* — Finnegan, Henderson, Farabow, Garrett and Dunner, LLP

(57) ABSTRACT

A power management system includes a plurality of power adjustment resources electrically connected to a microgrid MG, and a CEMS server that manages the power adjustment resources. The CEMS server outputs a power adjustment request to a plurality of power adjustment resources when suppression of power consumption or consumption of surplus power is requested in the microgrid MG, and gives an incentive to the power adjustment resource that performs power adjustment in response to the power adjustment request among the power adjustment resources. The CEMS server increases the incentive more as a deviation of a second power amount adjusted by a responding resource with respect to a first power amount requested for adjustment by the power adjustment request is smaller.

7 Claims, 4 Drawing Sheets

(51) Int. Cl.
*H02J 3/32* (2006.01)
*B60L 55/00* (2019.01)

(52) U.S. Cl.
CPC ....... *H02J 2310/48* (2020.01); *H02J 2310/64* (2020.01)

(58) Field of Classification Search
CPC .... H02J 2300/20; H02J 2300/40; H02J 1/106; H02J 1/14; H02J 3/008; H02J 3/06; H02J 3/144; H02J 3/38; H02J 13/00004; H02J 3/381; H02J 2300/10; H02J 2300/24; H02J 2300/30
USPC ........................................................ 320/109
See application file for complete search history.

(56) References Cited

U.S. PATENT DOCUMENTS

| | | | |
|---|---|---|---|
| 2015/0046222 A1 | 2/2015 | Ishii | |
| 2016/0164313 A1* | 6/2016 | Ohta | H02J 7/0013 700/297 |
| 2016/0276832 A1* | 9/2016 | Kawai | H02J 13/00001 |
| 2017/0343973 A1* | 11/2017 | Kitaji | H02J 3/144 |
| 2020/0317075 A1 | 10/2020 | Yokoyama et al. | |
| 2020/0403419 A1* | 12/2020 | Yokoyama | G06Q 30/0207 |
| 2021/0129689 A1 | 5/2021 | Nakamura et al. | |
| 2022/0009361 A1* | 1/2022 | Suzuki | H02J 1/14 |

\* cited by examiner

POWER MANAGEMENT SYSTEM, SERVER, AND METHOD OF ADJUSTING POWER DEMAND AND SUPPLY

CROSS-REFERENCE TO RELATED APPLICATION

This application claims priority to Japanese Patent Application No. 2021-096392 filed on Jun. 9, 2021, incorporated herein by reference in its entirety.

BACKGROUND

1. Technical Field

The present disclosure relates to a power management system, a server, and a method of adjusting power demand and supply.

2. Description of Related Art

WO 2013/115318 discloses a power demand and supply adjustment system capable of providing incentive information effective in adjusting power demand and supply to a user.

SUMMARY

A plurality of power adjustment resources (power generators, variable renewable energy sources, power storage systems, charging facilities, vehicles, and the like) is electrically connected to a power network, such as a microgrid. In a case where a request for performing power adjustment of the power network is output from a server to each power adjustment resource, a part of power adjustment resources normally performs the power adjustment in response to the request. Even though there is a power adjustment resource that can respond to the request, when the response does not sufficiently conform to the request, appropriate power adjustment may not be performed.

The present disclosure relates to a technique for performing appropriate power adjustment of a power network.

A first aspect of the present disclosure relates to a power management system including a plurality of power adjustment resources and a server. The power adjustment resources are electrically connected to a power network. The server manages the power adjustment resources. The server is configured to output a power adjustment request to the power adjustment resources when suppression of power consumption or consumption of surplus power in the power network is requested, and give an incentive to a responding resource as the power adjustment resource that performs power adjustment in response to the power adjustment request among the power adjustment resources. The server is configured to increase the incentive more as a deviation of a second power amount adjusted by the responding resource with respect to a first power amount requested for adjustment by the power adjustment request is smaller.

In the first aspect, the server may be configured to increase the incentive more as a magnitude of a difference between the first power amount and the second power amount is smaller.

In the first aspect, when suppression of power consumption or consumption of surplus power in the power network is requested, the power adjustment request may be output from the server to the power adjustment resource. In a case where the power adjustment resource responds to the power adjustment request, as the deviation of the second power amount with respect to the first power amount is smaller, a greater incentive (for example, fee discount) is given to the power adjustment resource. Accordingly, a user (owner, manager, or the like) of a power adjustment resource who wants to obtain as a large incentive as possible is expected to allow the second power amount to have a value sufficiently close to the first power amount. Therefore, it is possible to perform appropriate power adjustment of the power network.

In the first aspect, the responding resource may include a vehicle configured to be charged with supply power from the power network. The incentive may include a charging fee from the power network to the vehicle.

In the first aspect, the responding resource may include a vehicle configured to perform power feeding to the power network. The incentive may include a power feeding fee from the vehicle to the power network.

In the first aspect, the responding resource may include a vehicle configured to send and receive power to and from the power network. The incentive may include a parking fee for a parking space where the vehicle parks to send and receive the power to and from the power network.

According to the first aspect, it is possible to give an incentive that motivates a user of the vehicle to respond to the power adjustment request.

A second aspect of the present disclosure relates to a server that manages a plurality of power adjustment resources for use in adjusting supply power from a power system to a power network. The server includes a processor, and a memory that stores a program executable by the processor. The processor is configured to output a power adjustment request to the power adjustment resources when suppression of power consumption or consumption of surplus power in the power network is requested, and give an incentive to a responding resource as the power adjustment resource that performs power adjustment in response to the power adjustment request among the power adjustment resources. The processor is configured to increase the incentive more as a deviation of a second power amount adjusted by the responding resource with respect to a first power amount requested for adjustment by the power adjustment request is smaller.

According to the second aspect, as in the first aspect, it is possible to perform appropriate power adjustment of the power network.

A third aspect of the present disclosure relates to a method of adjusting power demand and supply that manages a plurality of power adjustment resources for use in adjusting supply power from a power system to a power network. The method of adjusting power demand and supply includes outputting a power adjustment request to the power adjustment resources when suppression of power consumption or consumption of surplus power in the power network is requested, giving an incentive to a responding resource as the power adjustment resource that performs power adjustment in response to the power adjustment request among the power adjustment resources, and increasing the incentive more as a deviation of a second power amount adjusted by the responding resource with respect to a first power amount requested for adjustment by the power adjustment request is smaller.

According to the third aspect, as in the first aspect, it is possible to perform appropriate power adjustment of the power network.

According to the present disclosure, it is possible to perform appropriate power adjustment of the power network.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
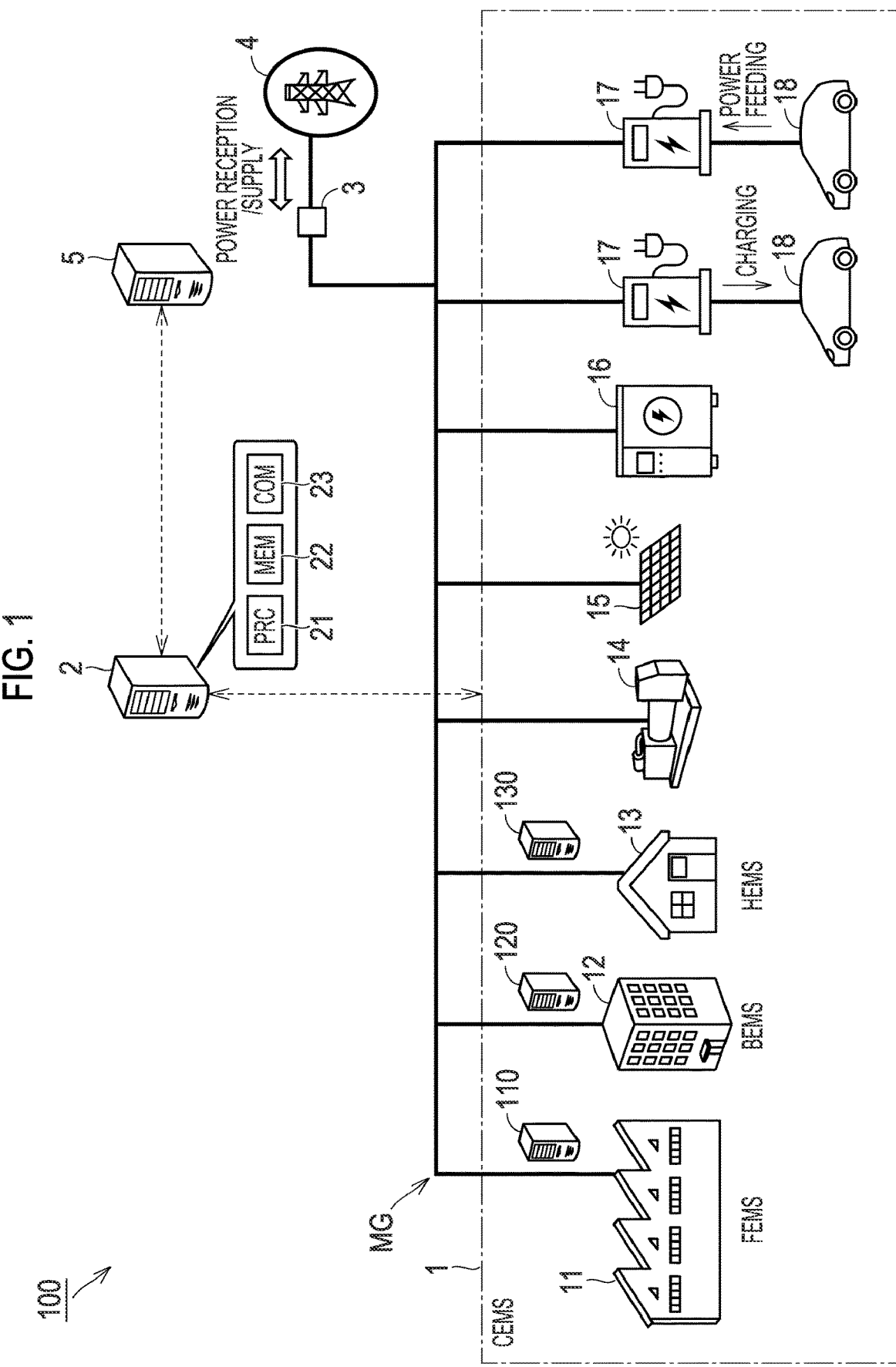
FIG. 1 is a diagram showing the schematic configuration of a power management system according to an embodiment of the present disclosure.

Hereinafter, an embodiment of the present disclosure will be described in detail referring to the drawings. The same or corresponding portions in the drawings are represented by the same reference numerals and description thereof will not be repeated.

EMBODIMENT

Overall Configuration of Power Management System

FIG. 1 is a diagram showing the schematic configuration of a power management system according to the embodiment of the present disclosure. A power management system 100 includes a CEMS 1, a CEMS server 2, a power receiving and transforming facility 3, a power system 4, and a power transmission and distribution service provider server 5. The CEMS means a community energy management system or a city energy management system.

The CEMS 1 includes a factory energy management system (FEMS) 11, a building energy management system (BEMS) 12, a home energy management system (HEMS) 13, a power generator 14, a variable renewable energy source 15, a power storage system (Energy Storage System (ESS))16, charging facilities (Electric Vehicle Supply Equipment (EVSE)) 17, and vehicles 18. In the CEMS 1, a microgrid MG is constructed by such constituent elements. The microgrid MG can be regarded as an example of a "power network" according to the present disclosure.

The FEMS 11 is a system that manages demand and supply of power used in factories. The FEMS 11 includes factory buildings (including lighting equipment, air conditioning equipment, and the like) and industrial facilities (production lines and the like) that operate with power supplied from the microgrid MG. Though not shown, the FEMS 11 can include power generation facilities (power generators, solar panels, and the like) provided in factories. Power generated by such power generation facilities may be supplied to the microgrid MG. The FEMS 11 further includes an FEMS server 110 that can perform two-way communication with the CEMS server 2.

The BEMS 12 is a system that manages demand and supply of power used in buildings, such as offices or commercial facilities. The BEMS 12 includes lighting equipment and air conditioning equipment provided in buildings. The BEMS 12 may include power generation facilities (solar panels and the like) or may include cold and heat source systems (waste heat recovery systems, heat storage systems, and the like). The BEMS 12 further includes a BEMS server 120 that can perform two-way communication with the CEMS server 2.

The HEMS 13 is a system that manages demand and supply of power used in a home. The HEMS 13 includes household appliances (lighting equipment, air conditioning equipment, and other appliances) that operate with power supplied from the microgrid MG. The HEMS 13 may include solar panels, household heat pump systems, household cogeneration systems, household storage batteries, and the like. The HEMS 13 further includes an HEMS server 130 that can perform two-way communication with the CEMS server 2.

The power generator 14 is a power generation facility that does not depend on weather conditions, and outputs generated power to the microgrid MG. The power generator 14 includes a steam turbine power generator, a gas turbine power generator, a diesel engine power generator, a gas engine power generator, a biomass power generator, a stationary fuel cell, or the like. The power generator 14 may include a cogeneration system that utilizes heat generated at the time of power generation.

The variable renewable energy source 15 is a power generation facility the power generation output of which varies depending on weather conditions, and output generated power to the microgrid MG. Although a solar power generation facility (solar panel) is shown in FIG. 1, the variable renewable energy source 15 may include a wind power generation facility instead of or in addition to the solar power generation facility.

The power storage system 16 is a stationary power source that stores power generated by the variable renewable energy source 15 and the like. The power storage system 16 is a secondary battery, and for example, is a lithium-ion battery or a nickel-hydrogen battery of a battery (recycling product) used in a vehicle. Note that the power storage system 16 is not limited to the secondary battery, and may be power to gas equipment that produces gaseous fuel (hydrogen, methane, and the like) using surplus power.

The charging facilities 17 are electrically connected to the microgrid MG, and are configured to be charged with power from and to discharge power (perform power feeding) to the microgrid MG.

The vehicles 18 are specifically plug-in hybrid electric vehicles (PHEV), battery electric vehicles (BEV), and the like. Each vehicle 18 is configured to perform one or both of external charging and external power feeding. That is, the vehicle 18 is configured such that power is supplied from the microgrid MG to the vehicle 18 when a charging cable is connected to an inlet (not shown) of the vehicle 18 (external charging). The vehicle 18 may be configured such that power is supplied from the vehicle 18 to the microgrid MG when the charging cable is connected to an outlet (not shown) of the vehicle 18 (external power feeding).

In an example shown in FIG. 1, although the number of FEMSs 11, the number of BEMSs 12, the number of HEMSs 13, the number of power generators 14, the number of variable renewable energy sources 15, and the number of power storage systems 16 included in the CEMS 1 are one, the number of such systems or facilities is optional. The CEMS 1 may include a plurality of such systems or facilities or systems or facilities not included in the CEMS 1 may be provided. Since each of the FEMS 11 (factory buildings, industrial facilities, and the like), the BEMS 12 (lighting equipment, air conditioning equipment, and the like), the HEMS 13 (household appliances and the like), the power generator 14, the variable renewable energy source 15, the power storage system 16, the charging facilities 17, and the vehicles 18 included in the CEMS 1 can be regarded as a "power adjustment resource" according to the present disclosure, such systems or facilities are hereinafter described as "power adjustment resources" unless such systems or facilities are to be not particularly distinguished from one another.

The CEMS server 2 is a computer that manages the power adjustment resources in the CEMS 1. The CEMS server 2 includes a control device 21, a storage device 22, and a communication device 23. The control device 21 includes a processor and is configured to execute predetermined arithmetic processing. The storage device 22 includes a memory that stores a program to be executed by the control device 21, and stores various kinds of information (maps, relational expressions, parameters, and the like) for use in the program. The communication device 23 includes a communication interface and is configured to perform communication with the outside (another server and the like).

The CEMS server 2 may be an aggregator server. An aggregator is an electric utility that provides an energy management service by putting together a plurality of power adjustment resources. The CEMS server 2 can be regarded as a "server" according to the present disclosure. A server (110, 120, 130) included in each system of the FEMS 11, the BEMS 12, and the HEMS 13 can also be regarded as a "server" according to the present disclosure.

The power receiving and transforming facility 3 is provided at a connection point (power receiving point) of the microgrid MG and is configured to be switchable between parallel (connection)/parallel-off (disconnection) of the microgrid MG and the power system 4. The power receiving and transforming facility 3 includes a high-voltage side (primary) opening and closing device, a transformer, a protection relay, measuring equipment, and a control device (all are not shown). When the microgrid MG is connected with the power system 4, the power receiving and transforming facility 3 receives alternating-current power of, for example, an extra-high voltage (a voltage exceeding 7000 V) from the power system 4, steps down the received power, and supplies power to the microgrid MG.

The power system 4 is a power network constructed by a power station and a power transmission and distribution facility. In the embodiment, a power company serves as a power generation service provider and a power transmission and distribution service provider. The power company corresponds to a general power transmission and distribution service provider and corresponds to a manager of the power system 4, and maintains and manages the power system 4.

The power transmission and distribution service provider server 5 is a computer that belongs to the power company and manages power demand and supply of the power system 4. The power transmission and distribution service provider server 5 is also configured to perform two-way communication with the CEMS server 2.

Mismatch with Power Adjustment Request

In a case where a request for performing the power adjustment of the microgrid MG is output from the CEMS server 2 to a power adjustment resource, the power adjustment resource performs the power adjustment in response to the power adjustment request. Meanwhile, when a response of the power adjustment resource does not sufficiently conform to the power adjustment request, the CEMS server 2 may have difficulty in appropriately managing power demand and supply in the microgrid MG.

Figure 2:
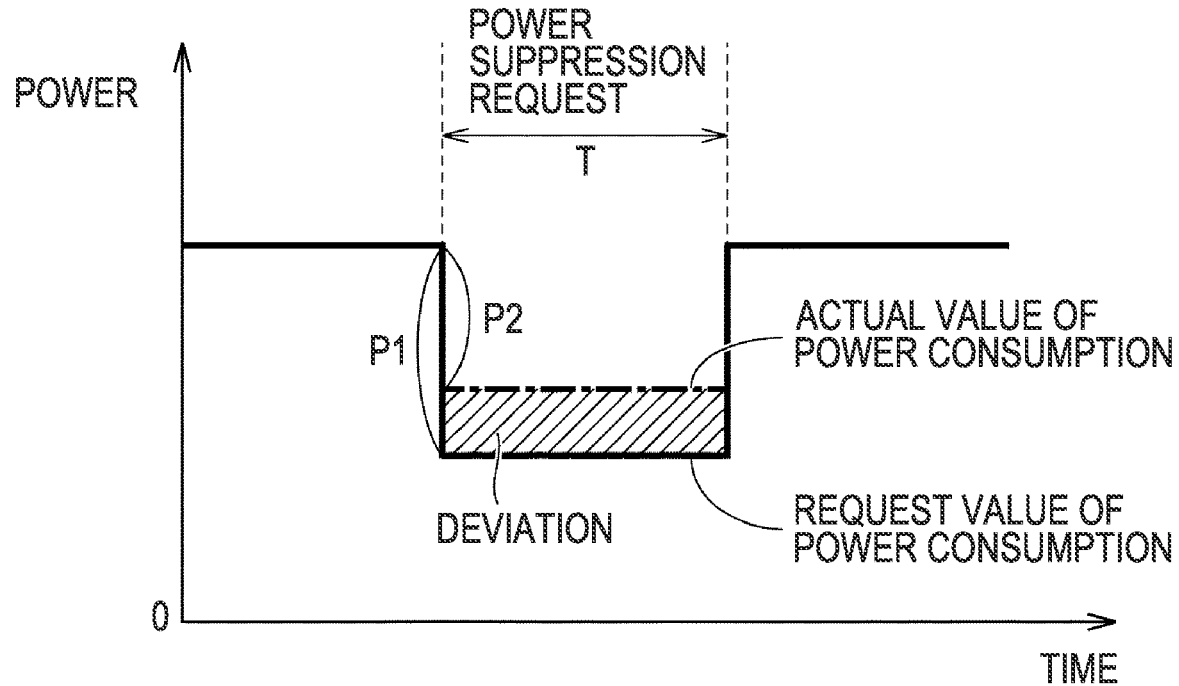
FIG. 2 is a time chart illustrating an example of a mismatch with a power adjustment request.

FIG. 2 is a time chart illustrating an example of a mismatch with the power adjustment request. The horizontal axis represents an elapsed time. In this example, a situation in which suppression of power consumption in the microgrid MG is requested in a period T is assumed.

The CEMS server 2 outputs a "suppression request" as a request for suppression of power consumption in the microgrid MG to a power adjustment resource. The power adjustment resource (regarded as a "responding resource" according to the present disclosure) responds to the suppression request and suppresses power consumption compared to before the response to the suppression request. For simplification, in this example, the power adjustment resource quickly responds to the suppression request from the CEMS server 2. That is, a deviation in terms of time does not occur between a timing at which the suppression request is output from the CEMS server 2 and a timing at which power consumption is actually suppressed by the power adjustment resource.

On the other hand, a deviation of about a given amount occurs between a power consumption amount requested for adjustment by the suppression request and a power consumption amount actually suppressed by the power adjustment resource. In the example shown in FIG. 2, while suppression of power consumption of P1 is requested, actual suppression of power consumption by the power adjustment resource keeps P2. While the power consumption amount requested for suppression is P1×T, the power consumption amount that is actually suppressed is P2×T, and a deviation of (P1-P2)×T occurs between the two power amounts. When such a deviation occurs, as the deviation is greater, power demand and supply management in the microgrid MG is more hardly performed.

Accordingly, in the embodiment, a configuration is employed in which, as the "deviation" between the power consumption amount requested for suppression by the suppression request and the power consumption amount that is actually suppressed by the power adjustment resource is smaller (the degree of matching between both power consumption amounts is higher), a greater incentive is given from the CEMS server 2 to the power adjustment resource. Therefore, as the power adjustment resource more strictly conforms to the suppression request in terms of the power amount, a greater incentive is given to the power adjustment resource.

Incentive

Figure 3:
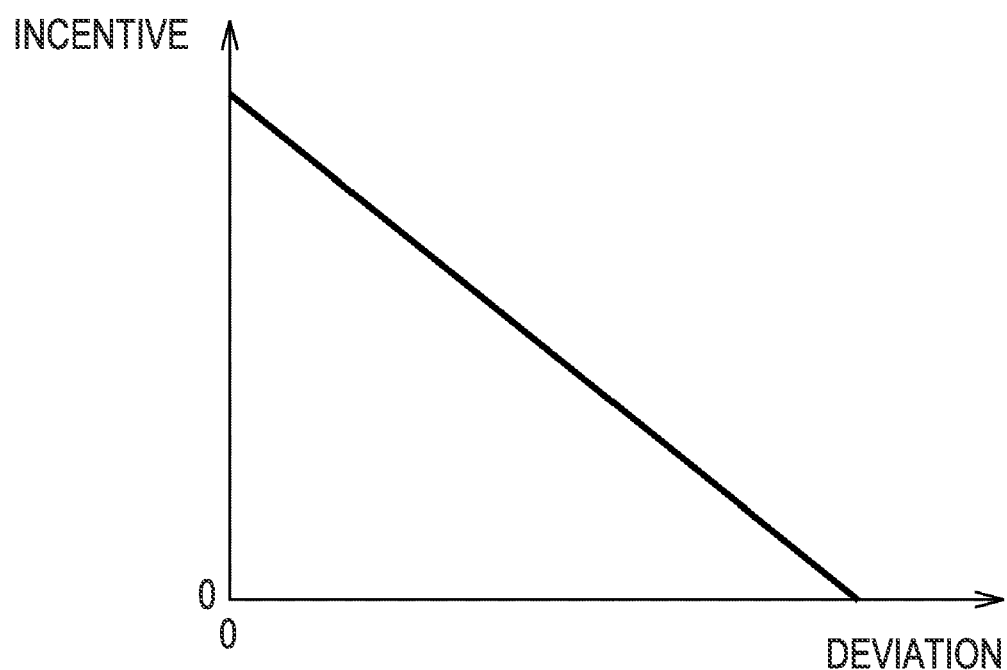
FIG. 3 is a diagram showing a first example of a setting method of an incentive depending on a deviation.
Figure 4:
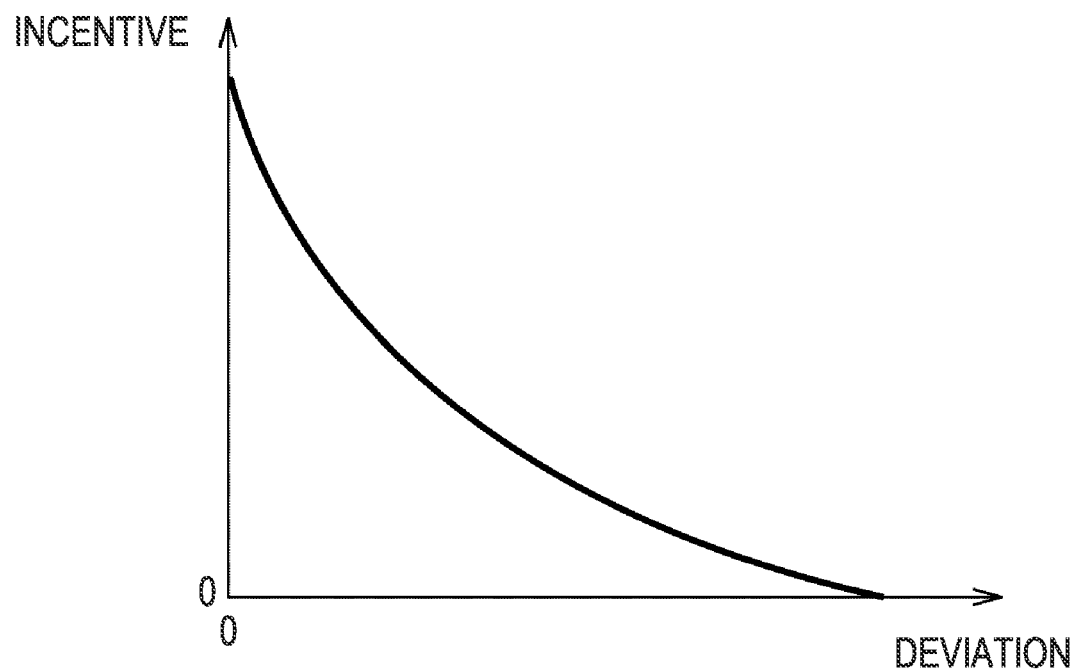
FIG. 4 is a diagram showing a second example of a setting method of an incentive depending on a deviation.
Figure 5:
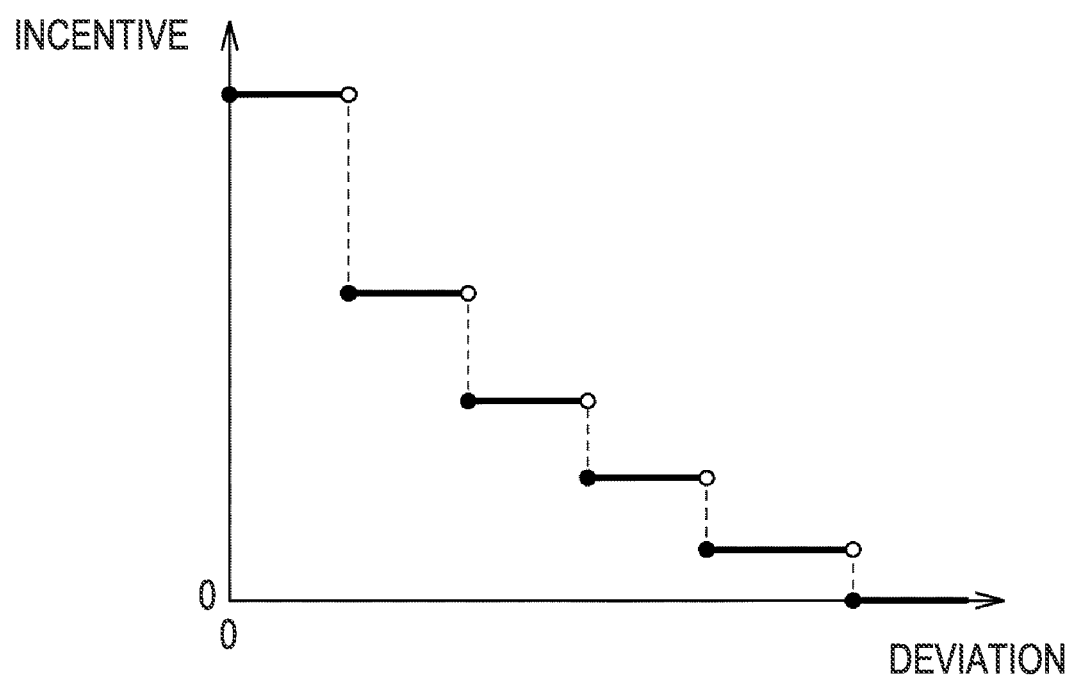
FIG. 5 is a diagram showing a third example of a setting method of an incentive depending on a deviation.

FIG. 3 is a diagram showing a first example of a setting method of an incentive depending on a deviation. FIG. 4 is a diagram showing a second example of a setting method of an incentive depending on a deviation. FIG. 5 is a diagram showing a third example of a setting method of an incentive depending on a deviation. The horizontal axis represents a deviation in power amount. The deviation may be (P1-P2)×T or may be a value (for example, (P1-P2)/P1) obtained by converting the value of (P1-P2)×T into a relative value. The vertical axis represents an incentive that is given from the CEMS server 2 to the power adjustment resource.

In the embodiment, as the deviation is smaller, the incentive is determined to be greater. A relationship between the deviation and the incentive is a linear relationship shown in FIG. 3, for example. Note that the relationship is not limited thereto, and may be a curved relationship (see FIG. 4) or may be a stepwise relationship (see FIG. 5).

The magnitude of the incentive is defined by, for example, a fee. Specifically, a greater incentive means that, for example, an electric charge to be paid by a user (owner) of a power adjustment resource in the CEMS 1 is lower. As an example, when the power adjustment resource is the vehicle 18, as the incentive is greater, a charging fee to the vehicle 18 in external charging is lower. Alternatively, a greater incentive means that a power sale charge to be received by the user is higher. When the power adjustment resource is the vehicle 18, as the incentive is greater, a power feeding fee from the vehicle 18 in external power feeding is higher. The incentive may be a parking fee of the vehicle 18 at the time of external charging or at the time of external power feeding.

In this way, the incentive depending on the deviation in power amount is introduced, whereby it is possible to expect that the power adjustment resource more strictly conforms to the suppression request to perform power adjustment. As a result, it is possible to appropriately manage power demand and supply in the microgrid MG. With this, it is possible to observe a contract between the CEMS 1 and the power company.

In FIG. 2, for ease of understanding, although a simple example where power changes merely two times in a stepwise manner has been described, power may change three times or more in a stepwise manner or power may change continuously.

Processing Flow

Hereinafter, a configuration in which where the vehicle 18 is used as the power adjustment resource will be described as an example. In this example, the power adjustment of the microgrid MG is performed by suppressing charging power from the microgrid MG to the vehicle 18 through the charging facility 17 (performing power feeding from the vehicle 18 to the microgrid MG through the charging facility 17.

Figure 6:
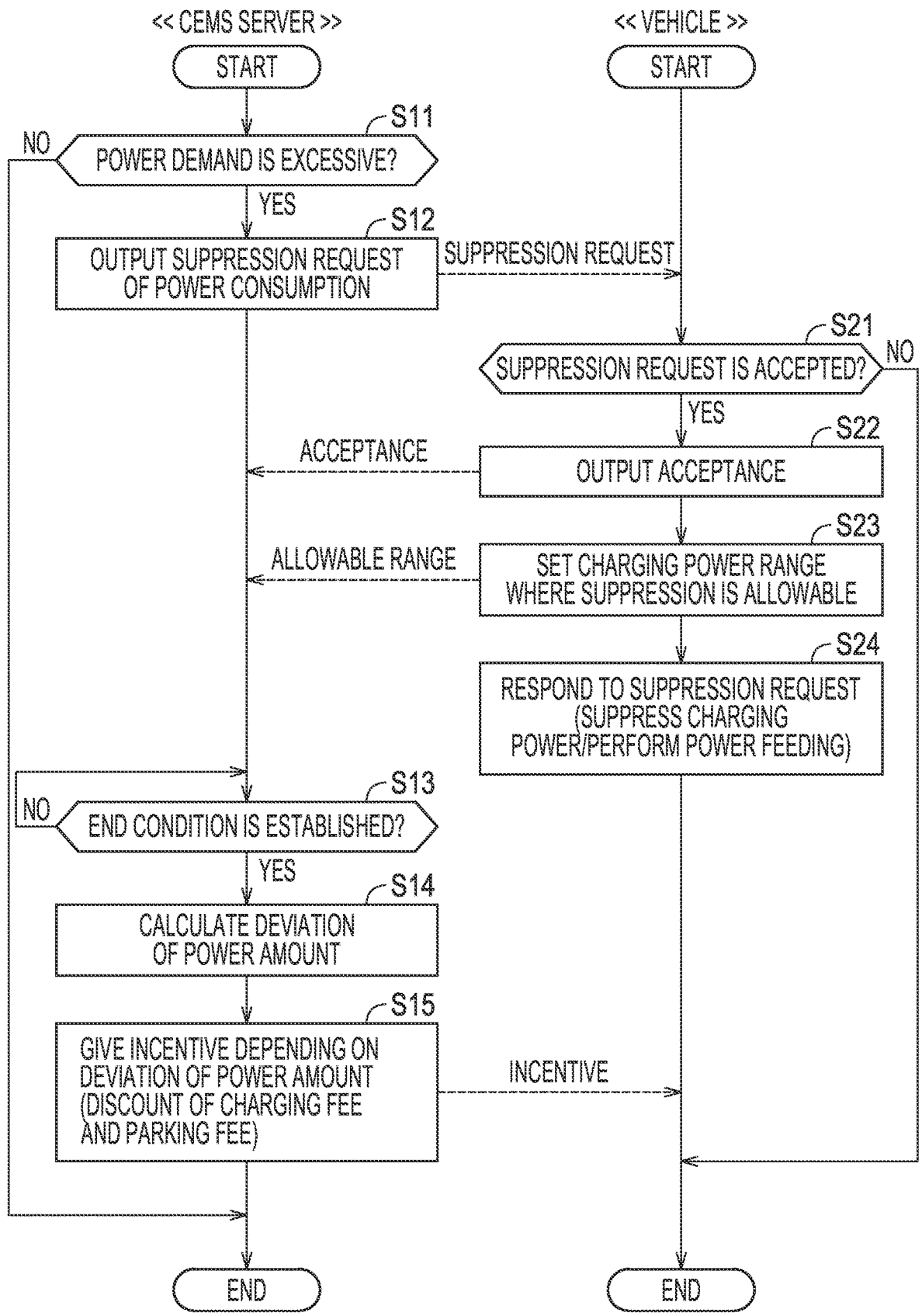
FIG. 6 is a flowchart illustrating processing related to setting of an incentive in the embodiment.

FIG. 6 is a flowchart illustrating processing related to setting of an incentive in the embodiment. The flowchart is called from a main routine (not shown) and executed each time a predetermined condition is established or in each predetermined cycle. In FIG. 6, a series of processing that is executed by the CEMS server 2 is shown on a left side, and a series of processing that is executed by the vehicle 18 is shown on a right side. Although each step is realized by software processing with the CEMS server 2 or an electronic control unit (ECU) of the vehicle 18, each step may be realized by hardware (electric circuits) in the CEMS server 2 or the vehicle 18. Hereinafter, Step is abbreviated as S.

In S11, the CEMS server 2 determines whether or not the occurrence of a situation in which power demand of the microgrid MG is excessive is predicted. For example, the CEMS server 2 can determine that the situation in which power demand is excessive may occur when a ratio (or a difference) of an actual supply power amount to a supply power amount planned in 30-minute balancing exceeds a predetermined value. Alternatively, the CEMS server 2 may determine that the situation in which power demand is excessive may occur when a ratio of total power consumption of the power adjustment resources in the microgrid MG to supply power from the power system 4 to the microgrid MG is predicted to be higher than a predetermined value based on past power consumption records.

When the situation in which power demand is excessive does not occur (in S11, NO), subsequent processing is not executed, and the process returns to the main routine. When the situation in which power demand is excessive may occur (in S11, YES), the CEMS server 2 requests the vehicle 18 to suppress charging power (S12).

A user of the vehicle 18 who receives the suppression request responds whether or not the suppression request can be accepted (S21). For example, when the user performs an operation indicating that the suppression request can be accepted, on a human machine interface (HMI) of the vehicle 18 or a user terminal, such as a smartphone, (both are not shown), the vehicle 18 can respond that the suppression request can be accepted. When the user does not accept the suppression request (in S21, NO), the vehicle 18 returns the process to the main routine. When the suppression request is accepted (in S21, YES), the vehicle 18 outputs the acceptance to the CEMS server 2 (S22).

In S23, the user sets an allowable range regarding what degree suppression of charging power to the vehicle 18 is allowable. For example, the user can set to allow suppression of charging power as requested by the suppression request. Alternatively, when a charging time is excessively extended in a case where charging power is suppressed as requested by the suppression request, the user may set an allowable range of suppression of charging power. A specific example will be described. The user may set to allow suppression of maximum charging power to the vehicle 18 up to 10 kW while charging power (maximum power to be supplied) of the charging facility 17 is 40 kW. The user may set to allow suppression of charging power within 50% of power at the time of normal charging (when suppression request is not issued). The user may set to allow suppression of charging power within a range in which charging can be completed until three hours later. The user may set the above-described range in advance before the suppression request is issued. The set range is sent to the CEMS server 2.

In S24, the vehicle 18 responds to the suppression request. That is, the vehicle 18 suppresses charging power from the microgrid MG to the vehicle 18 within the range set in S23 compared to before the suppression request is accepted. Although suppression of charging power has been described herein as an example, on the contrary, power feeding from the vehicle 18 to the microgrid MG may be performed.

In S13, the CEMS server 2 determines whether or not an end condition regarding power consumption suppression in the microgrid MG is established. The CEMS server 2 can determine that the end condition is established, for example, when a predetermined has elapsed from when the suppression request is output. When the end condition is established (in S13, YES), the CEMS server 2 calculates a deviation between a power consumption amount requested for suppression by the suppression request and a power consumption amount actually suppressed by the power adjustment resource (S14). As described above, the deviation may be a difference (P1-P2)×T between the power amounts or may be a proportion (P1-P2)/P1 of the difference (P1-P2)×T between the power amounts to the power consumption amount P1×T requested for suppression by the suppression request.

In S15, the CEMS server 2 gives an incentive depending on the deviation calculated in S14 to the vehicle 18. As described referring to FIGS. 3 to 5, the incentive is set to be greater as the deviation is smaller.

As described above, in the embodiment, when a situation in which power demand is excessive is predicted, the suppression request of charging power is output from the CEMS server 2 to the vehicle 18. When the user of the vehicle 18 accepts suppression of charging power, as a charging power amount that is actually suppressed is closer to a charging power amount when suppressed conforming to the suppression request, a greater incentive (a discount of a charging fee, a discount of a parking fee, or the like) is given to the user. Accordingly, since the user who wants to obtain as a large incentive as possible is expected to allow sufficiently significant suppression of charging power acceptable by the user, it is possible to reduce a deviation in charging power amount between when actually suppressed and when requested. Therefore, according to the embodiment, the CEMS server 2 can appropriately manage the power demand and supply of the microgrid MG.

In this example, a case where, when the occurrence of the situation in which power demand in the microgrid MG is excessive is predicted, the incentive depending on the deviation in power amount is given has been described. Similarly, even when the situation in which power demand is excessive already occurs, it is possible to give an incentive depending on a deviation in power amount. Although an example where power consumption in the microgrid MG is suppressed has been described in FIGS. 2 and 6, the CEMS server 2 can set an incentive variable even when consumption of surplus power of the power system 4 increases in the microgrid MG.

The embodiment disclosed herein is to be considered merely illustrative and not restrictive in all respects.

What is claimed is:

1. A power management system comprising:
    a plurality of power adjustment resources electrically connected to a power network; and
    a server configured to manage the power adjustment resources and output a power adjustment request to the power adjustment resources when suppression of power consumption or consumption of surplus power in the power network is requested,
    wherein:
        the power adjustment resources include a responding resource that is configured to perform the power adjustment in response to the power adjustment request, and
        the responding resource is configured to set an allowable range regarding the range to which the power adjustment is allowed and perform the power adjustment within the allowable range; and
    the server is configured to
    give an incentive to the responding resource, and
    increase the incentive more as a deviation of a second power amount adjusted by the responding resource with respect to a first power amount requested for adjustment by the power adjustment request is smaller.

2. The power management system according to claim 1, wherein the server is configured to increase the incentive more as a magnitude of a difference between the first power amount and the second power amount is smaller.

3. The power management system according to claim 1, wherein:
    the responding resource includes a vehicle configured to be charged with supply power from the power network; and
    the incentive includes a charging fee from the power network to the vehicle.

4. The power management system according to claim 1, wherein:
    the responding resource includes a vehicle configured to perform power feeding to the power network; and
    the incentive includes a power feeding fee from the vehicle to the power network.

5. The power management system according to claim 1, wherein:
    the responding resource includes a vehicle configured to send and receive power to and from the power network; and
    the incentive includes a parking fee for a parking space where the vehicle parks to send and receive the power to and from the power network.

6. A server configured to manage a plurality of power adjustment resources for use in adjusting supply power from a power system to a power network, the server comprising:
    a processor; and
    a memory that stores a program executable by the processor,
    wherein the processor is configured to
        output a power adjustment request to the power adjustment resources when suppression of power consumption or consumption of surplus power in the power network is requested, wherein:
            the power adjustment resources include a responding resource that is configured to perform the power adjustment in response to the power adjustment request, and
            the responding resource is configured to set an allowable range regarding the range to which the power adjustment is allowed and perform the power adjustment within the allowable range; and
    the processor is further configured to
        give an incentive to the responding resource, and
        increase the incentive more as a deviation of a second power amount adjusted by the responding resource with respect to a first power amount requested for adjustment by the power adjustment request is smaller.

7. A method of adjusting power demand and supply that manages a plurality of power adjustment resources for use in adjusting supply power from a power system to a power network, the method comprising:
    outputting a power adjustment request to the power adjustment resources when suppression of power consumption or consumption of surplus power in the power network is requested; wherein:
        the power adjustment resources include a responding resource that is configured to perform the power adjustment in response to the power adjustment request, and
        the responding resource is configured to set an allowable range regarding the range to which the power adjustment is allowed and perform the power adjustment within the allowable range;
    giving an incentive to the responding resource; and
    increasing the incentive more as a deviation of a second power amount adjusted by the responding resource with respect to a first power amount requested for adjustment by the power adjustment request is smaller.

* * * * *